United States Patent
Grimault et al.

(10) Patent No.: US 8,122,103 B2
(45) Date of Patent: Feb. 21, 2012

(54) METHOD FOR CONTROLLING A MULTIMEDIA DEVICE FROM A MOBILE TERMINAL, CORRESPONDING COMPUTER PROGRAMS, MULTIMEDIA DEVICE AND SERVER

(75) Inventors: Jean-Luc Grimault, Mondeville (FR); Olivier Normand, Fontaine Henry (FR); Aline Vongphouthone, Issy-les-Moulineaux (FR)

(73) Assignee: France Telecom, Paris (FR)

( * ) Notice: Subject to any disclaimer, the term of this patent is extended or adjusted under 35 U.S.C. 154(b) by 231 days.

(21) Appl. No.: 11/997,837

(22) PCT Filed: Jul. 28, 2006

(86) PCT No.: PCT/EP2006/064802
§ 371 (c)(1),
(2), (4) Date: May 13, 2008

(87) PCT Pub. No.: WO2007/017407
PCT Pub. Date: Feb. 15, 2007

(65) Prior Publication Data
US 2008/0228854 A1    Sep. 18, 2008

(30) Foreign Application Priority Data
Aug. 5, 2005   (FR) ..................... 05 08408

(51) Int. Cl.
*G06F 15/16* (2006.01)
(52) U.S. Cl. ......... 709/219; 709/204; 709/208; 709/217
(58) Field of Classification Search .................. 709/204, 709/208, 217, 219
See application file for complete search history.

(56) References Cited

U.S. PATENT DOCUMENTS

| | | | |
|---|---|---|---|
| 6,477,565 B1 * | 11/2002 | Daswani et al. | 709/217 |
| 2003/0212684 A1 * | 11/2003 | Meyer et al. | 707/10 |
| 2004/0175096 A1 | 9/2004 | Caspi et al. | 386/46 |
| 2006/0155814 A1 * | 7/2006 | Bennett et al. | 709/207 |

FOREIGN PATENT DOCUMENTS

| | | |
|---|---|---|
| WO | WO 01/47248 A2 | 6/2001 |
| WO | WO 02/05118 A2 | 1/2002 |
| WO | WO 02/097584 A2 | 12/2002 |

OTHER PUBLICATIONS

International Search Report dated Oct. 17, 2006 for corresponding International Application No. PCT/EP2006/064802, filed Jul. 28, 2006.
"Overview of UPnP AV Architecture" Development and Research INTEL, Jul. 2, 2003, XP002304266, p. 4, left-hand column, line 1—p. 7, right-hand column, line 22 abstract; figure 1.

* cited by examiner

*Primary Examiner* — Kenny Lin
(74) *Attorney, Agent, or Firm* — David D. Brush; Westman, Champlin & Kelly, P.A.

(57) ABSTRACT

A method is provided for controlling, via a mobile terminal, a multimedia device for playing back and/or storing multimedia contents, the mobile terminal and the multimedia device being connected to a communications network. The method includes the following steps: the mobile terminal sends to a remote server, via the communications network, at least one request for activating a functionality on the multimedia device; the remote server translates this at least one request made by the mobile terminal into at least one query and transmits this at least one query to the multimedia device via the communications network, and; the multimedia device receives and executes this at least one query.

13 Claims, 4 Drawing Sheets

METHOD FOR CONTROLLING A MULTIMEDIA DEVICE FROM A MOBILE TERMINAL, CORRESPONDING COMPUTER PROGRAMS, MULTIMEDIA DEVICE AND SERVER

CROSS-REFERENCE TO RELATED APPLICATIONS

This application is a Section 371 National Stage Application of International Application No. PCT/EP2006/064802, filed Jul. 28, 2006 and published as WO 2007/017407 A1 on Feb. 15, 2007, not in English.

FIELD OF THE DISCLOSURE

The field of the disclosure is that of a remote and/or local access and control of multimedia devices from a mobile terminal. More specifically, the disclosure relates to multimedia devices (such as an MP3 walkman, a DVD recorder, a digital terminal (of the set-top box type) for the playback and/or storage of multimedia contents in a specific format (for example of the MP3, AVI, MPEG, JPEG and other types) connected to a communications network (for example of the Internet type) through a direct link (for example through an ADSL or UMTS high-bit-rate link) or indirect link (for example through a LiveBox (registered marks) or Freebox (registered mark) or other type of residential gateway).

More specifically again, the disclosure relates to a technique for the control of such devices from a wireless communications terminal (for example a GSM, GPRS, UMTS, laptop or other type of mobile unit).

BACKGROUND OF THE DISCLOSURE

In general, the effective playback of the multimedia content or contents of a multimedia device is obtained, for example, by means of a television set, a Hi-Fi system or again a home cinema.

Conventionally, in the local command of a device for the playback and/or storage of multimedia contents, such a device is driven by means of a remote control unit specific to it. In general, a remote control unit of this kind uses the infrared channel as its transmission channel.

Today, there is high demand by users for access in a situation of mobility, especially in order to download or exchange files, for example audio type files in the MP3 format, between a mobile terminal and a data storage unit, for example of the personal computer (PC) type.

There are two methods of wireless access in the prior art enabling a mobile terminal to link up with and communicate with a personal computer (PC) playing the role of a multimedia device, through a radio link.

It must be noted that, to the knowledge of the inventors, the use of the two known techniques presented here below for a dedicated multimedia device (for example a drawing room DVD player) has never been envisaged.

Access by "proximity wireless link" (here below also called "simple mobile remote control" mode") is a first method according to which the mobile telephone and the personal computer (PC) are each equipped with a dedicated communications module, for example of the Bluetooth type (this standard is also known as IEEE 802.15), WiFi (Wireless Fidelity also known as the IEEE 802.11 standard), etc. This first method enables a mobile terminal to engage in direct local dialog with a personal computer (PC). It furthermore enables a user to use his terminal a remote control unit to control operations executed on a personal computer (PC). For example, a Bluetooth remote control unit enabling the control of the playback of musical files stored in a personal computer can be implemented by a personal digital assistant (PDA) equipped with a Bluetooth communications module on which there is installed a Bemused (registered mark) type control software program is installed. This program is executable by an operating system called Symbian (registered mark) embedded in the PDA. In this example, the commands of the PDA are transmitted to the PC through a wireless link according to a radio communications protocol under the Bluetooth standard.

Access by "asymmetric digital subscriber line" or ADSL is the second method according to which the mobile telephone and the personal computer (PC) use a high-bit-rate communications technology enabling the use of already existing telephone lines in order to achieve dialog through the Internet. To do this, a customer-specific software program is implemented in the mobile telephone and a specific software program (server) is implemented in the personal computer (PC). For example, the peer-to-peer Ipra*cool (registered mark) software program for the "remote sharing of applications" by Ipracom (registered mark), enables users to achieve remote access to files contained in a PC, from their "smartphones" or their PDA. It is well known in the prior art that multimedia devices implementing this type of Internet technology must be directly or indirectly connected (i.e. through a residential gateway) to the Internet.

At present, increasing numbers of manufacturers of multimedia devices are providing for IP connectivity on each of their devices, as is the case of example with the devices of the Danish company KISS Technologies (registered mark) so as to enable direct Internet connection, for example through an ADSL/IP link.

Although these methods of access have represented major progress in the mechanism of control of multimedia devices using wireless communications apparatuses, these prior art techniques nevertheless have the disadvantages of limiting the man/machine interface and the services offered by the multimedia devices from the wireless communications apparatuses.

Indeed, as already indicated, in the two prior art techniques, a light software is embedded in the multimedia device to receive and interpret the basic queries transmitted by the mobile terminal (example queries of the "play", "stop", and other types). A software program of this kind cannot be used by the multimedia device to propose elaborate and extensive services to the user (for example by associating music with speech etc).

One solution to this problem would consist in implementing a management and content presentation server in the multimedia device. However, this solution has a certain number of drawbacks.

The major drawback of this approach lies in the fact that the hosting of a server type software program that is more powerful (i.e. costly in terms of memory) and more complex substantially increases the cost of the multimedia device, at the risk of taking it out of the reach of the very large-scale consumer public.

Furthermore, whatever the type of use, whether near (simple mobile remote control mode) or remote (Internet technology) of the multimedia equipment, the use menus of the multimedia devices are static (because they reside in the multimedia devices). In other words, there is no interaction of these menus with the outside world. For example, it is not possible to obtain the display on the mobile terminal screen of a page of dialog (for example in the WMF, XHTML, HTML and other formats) having both musical files localized in the multimedia equipment and musical files by the same author offered for purchase by a service operator. In the same way, it is not possible to publish promotional offers on this page that change daily or any other value-added service proposed by the operator. This type of device however is of great interest, both from the user's and the service operator's viewpoint.

Furthermore, this approach is not adapted to the reading of multimedia contents in streaming or downloading mode, from any mobile terminal. Indeed, the multimedia device cannot adapt to the constraints of different types of mobile terminals (i.e. to the streaming and encoding protocols of the different terminals) and of access networks. Once again, if the multimedia device fulfilled this function, it would be at the cost of hosting a complete streaming server leading to complexity and cost incompatible with equipment intended for the general public.

SUMMARY

A method is provided for controlling a multimedia device from a mobile terminal for the playback and/or storage of multimedia contents, the mobile terminal and the multimedia device being connected to a communications network, the method comprising the following steps:
  the mobile terminal sends to a remote server, through the communications network, at least one request for launching a functionality on the multimedia device;
  the remote server translates said at least one request of the mobile terminal into at least one query and transmits said at least one query to the multimedia device through the communications network;
  the multimedia device receives and executes said at least one query.

Thus, an embodiment of the invention relies on a wholly novel and inventive approach to the control of a multimedia device. Indeed, all the control intelligence and logic transferred to the remote server and the access network, making an embodiment of the invention exploitable for any type of mobile terminal and multimedia device, since these elements no longer require any complex and costly adaptation to be compatible with the method of an embodiment of the invention, a feature that is particularly worthwhile.

Advantageously, in the case wherein the execution of said at least one query consists of the transmission of multimedia data from the device to the remote server, the method further comprises the following steps:
  the remote server translates the multimedia data transmitted by the multimedia device into converted multimedia data presenting a form that can be understood by the mobile terminal;
  the remote server transmits the converted multimedia data to the mobile terminal.

In a preferred embodiment of the invention, the method further comprises the following step: the remote server enhances the converted multimedia data with additional data so as to transmit enhanced data to the mobile terminal.

According to an advantageous aspect of the invention, the method implements:
  a first authentication mechanism enabling the remote server to authenticate the mobile terminal and comprising the following steps:
    an access network, through which the mobile terminal is connected to the communications network, certifies an identifier of the mobile terminal;
    the remote server receives the identifier of the mobile terminal certified by the access network;
  a second authentication mechanism enabling the multimedia device to authenticate the remote server, and comprising the following steps:
    the remote server maintains a table which associates, with each identifier of the mobile terminal, an identifier of a multimedia device, an address at which the multimedia device can be contacted within the communications network and an access key to the multimedia device;
    from the identifier of the mobile terminal certified by the access network, the remote server retrieves the address and the access key in the table, links up with the multimedia device by using the address and implements a process of authentication based on the access key.

Preferably, said at least one query, transmitted to the multimedia device by the remote server, belongs to the group comprising:
  a query to supply a list of multimedia contents stored by the multimedia device;
  a query to supply a multimedia content stored by the multimedia device;
  a query to supply a multimedia content by the multimedia device;
  a query to playback a multimedia content by the multimedia device;
  a query to stop the playback of a multimedia content by the multimedia device;
  a query to temporarily interrupt the playback of a multimedia content by the multimedia device;
  a query to increase the sound volume of the playback of a multimedia content by the multimedia device;
  a query to reduce the sound volume of the playback of a multimedia content by the multimedia device.

Advantageously, in the case wherein the multimedia device execute a query for the supply of a multimedia content, the method further comprises the following steps:
  the remote server receives a multimedia content transmitted by the multimedia device;
  a streaming server included in the remote server retransmits the multimedia content continuously, in "streaming" mode, to the mobile terminal.

Preferably, in the case wherein the multimedia device execute a query for the supply of a multimedia content or a query for the supply of a list of multimedia contents, the method furthermore comprises the following steps:
  the remote server receives a multimedia content or a list of multimedia contents transmitted by the multimedia device;
  the remote server commands the storage of the multimedia content or the list of multimedia contents in a network storage space coupled with the remote server so that the mobile terminal can subsequently request the remote server to command the reading of the multimedia content or the list of multimedia contents stored in the network storage space.

Advantageously, the exchanges between the mobile terminal and the remote server are implemented by a page browser, included in the mobile terminal, and a page server, included in the remote server.

Preferably, the exchanges between the remote server and the multimedia device are implemented by an applications server included in the remote server, and a query-processing and data-transfer module included in the multimedia device.

An embodiment of the invention also relates to a computer program product downloadable from a communications network and/or recorded in a computer-readable carrier and/or executable by a processor comprising program code instructions for the execution, by a remote server, of certain steps of the method as described here above.

An embodiment of the invention also relates to a computer program product downloadable from a communications network and/or recorded in a computer-readable carrier and/or executable by a processor comprising program code instructions for the execution, by a multimedia device, of certain steps of the method as described here above.

An embodiment of the invention also relates to a multimedia device of the type that can be connected to a communications network, the multimedia device comprising means for receiving and executing of at least one query transmitted according to a master/slave communications protocol by a remote server, called a "master" through the communications network, said query corresponding to the translation of a request by a mobile terminal received by the remote server, through the communications network.

An embodiment of the invention also relates to a server of the type that can communicate with a mobile terminal and a multimedia device, through a communications network, the server comprising:
 means for receiving at least one request for launching a function on the multimedia device transmitted by the mobile terminal; through the communications network;
 first means for translating said at least one request of the mobile terminal into at least one query comprehensible to the multimedia device;
 first means for transmitting said at least one query to the multimedia device through the communications network;

Advantageously, the server comprises at least one of the following means:
 means for storing multimedia data transmitted by the multimedia device, through the communications network;
 second means for translating said multimedia data from the multimedia device into converted multimedia data, taking a form comprehensible to the mobile terminal;
 second means for transmitting the converted multimedia data to the mobile terminal, through the communications network
 third means for transmitting the converted multimedia data continuously, in "streaming" mode, to the mobile terminal.

BRIEF DESCRIPTION OF THE DRAWINGS

Other features and advantages shall appear more clearly from the following description of a preferred embodiment, given by way of a simple illustrative and non-restrictive example, and from the appended drawings, of which.

DETAILED DESCRIPTION OF ILLUSTRATIVE EMBODIMENTS

For the sake of simplification, the description shall be limited here below in the document to the particular case of a control of a multimedia device located in a user's home and connected to the Internet through an ADSL type home high-bit-rate link (for example through a LiveBox (registered mark) type residential gateway), from a smartphone (GPRS, Edge, UMTS, etc) having a light user interface module such as for example a page browser (also called a "browser" here below) (the pages are for example in the WML, XHTML, HTML, and other formats). Those skilled in the art will extend this teaching without difficulty to a mobile terminal of any other nature (for example a laptop, PDA etc) equipped with any other light customer software as well as to a multimedia device located in another place (four example in a car, a meeting room etc) and connected to the Internet by another type of connection (wire, terrestrial radio, satellite network etc).

As will be noted in all the figures of the present document, identical elements and steps are designated by a same numerical reference.

For the sake of clarity, in all the figures of the present document, the means are referenced by numerical references (such as 1, 2, 3...) and the steps of the method are referenced by alphanumeric references (such as E1, E2, E3, ...).

1. General Principle

The general principle of an embodiment of the invention relies on a technique of remote processing of requests of a mobile terminal, aimed at providing queries, used to control the functions of a multimedia device.

The technique of remote processing of requests by a mobile terminal according to an embodiment of the invention can especially obtain the playback at the mobile terminal of an identical user interface in a situation of mobility and proximity to the multimedia device.

This method for controlling multimedia devices according to an embodiment of the invention brings into play especially a remote server accessible from the mobile terminal through a communications network. According to such a method, the entire user interface, the presentation and the playback of multimedia data on the mobile terminal as well as the intelligence of the service of access to the multimedia device are provided by the remote server. The multimedia device has only a role of "slave" relative to the remote server which plays the role of the "master" in sending queries for execution to the multimedia device. The mobile telephone for its part is never directly linked (i.e. it never communicates directly) with the multimedia device but always through the remote server.

Figure 1:
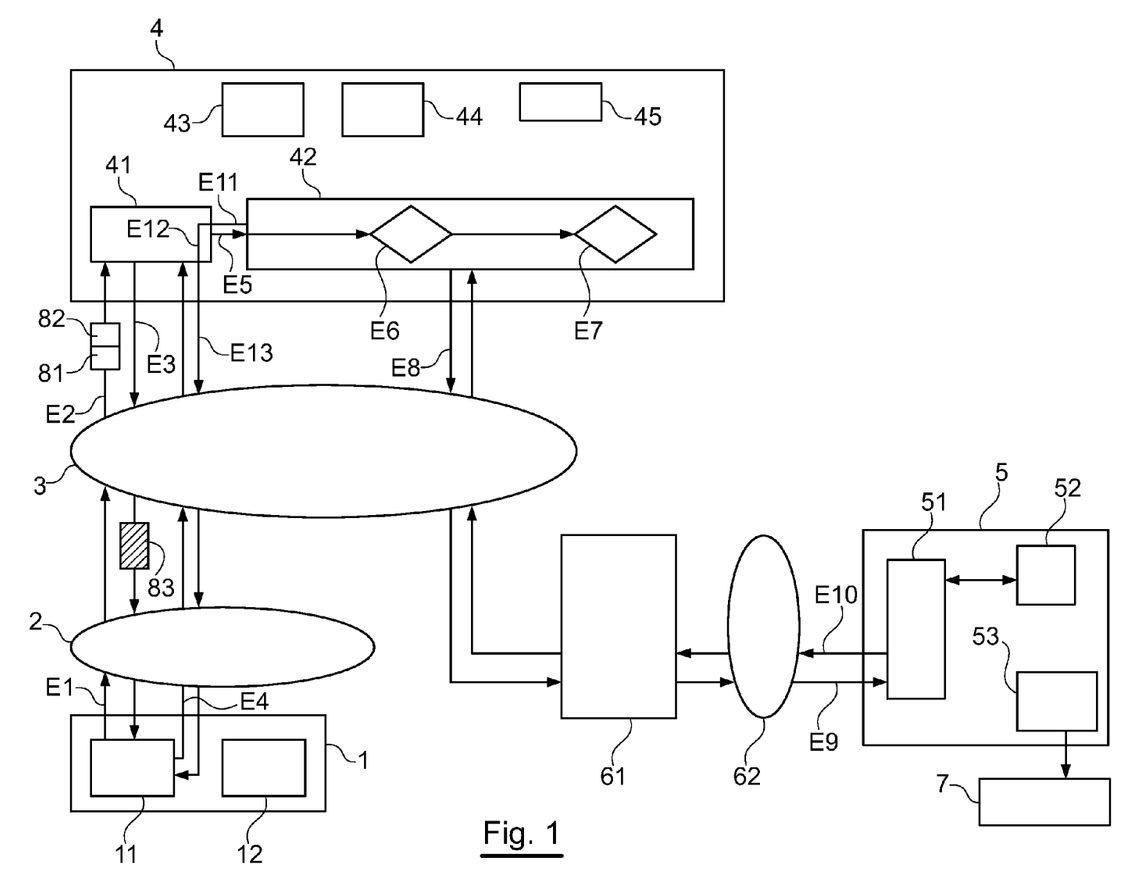
FIG. 1 illustrates the general principle of the method according to an embodiment of the invention.

This general principle is illustrated in FIG. 1.

Classically, it is assumed that a mobile terminal 1, for example a smartphone, comprises a radio communications module (not shown) giving it the capacity to link up through a wireless link to (for example a GPRS, Edge, UMTS, WiFi, Bluetooth, or other similar link) to a communications network 3, for example, of the Internet type. The mobile terminal 1 furthermore comprises a browser 11 enabling the transmission of the requests entered by a user (for example through a keyboard, a joystick, a button or any other man/machine interface or MMI) to a remote server 4 situated in the communications network 3. The mobile telephone also has a streaming customer 12 enabling the playback of a multimedia stream sent in "streaming" mode.

According to an embodiment of the invention, the remote server 4 hosts the logic and the user interface of the service for access and use of a multimedia device 5.

In this particular embodiment, the remote server 4 comprises a page server 41 used to serve pages (for example in the WML, XHTML, HTML, or other similar format) to the browser 11 of the terminal 1 and an applications server 42 used firstly to translate the requests of the user entered by the mobile terminal 1 and, secondly to send queries to the multimedia device 5.

The page server 41 is implemented when the user (through the MMI of the mobile terminal) clicks on an access link to pages ((WML, XHTML or HTML) having functions involving the multimedia device 5.

A single authentication mechanism, for example of the SSO (single sign-on) type is implemented when the user starts browsing through the pages served by the page server 41. In the present embodiment, this single authentication mechanism enables a user already authenticated for access to a first service (for example access to the personalized portal offered by a service provider) to be freed of the need for additional authentication during the passage to another service (in this case the page server for the control of the multimedia device 5).

It must be noted that in the case of access by a cell network, the authentication with the first services automatic because the cell network authenticates the mobile terminal 1 on the basis of its SIM identifier. Thus, when the data server 41 is implemented, it receives an HTTP query accompanied by the MSISDN (Mobile Station Integrated Services Digital Network) number of the mobile telephone 1. The reliability of this value of MSISDN is ensured by the cell network 2.

Furthermore, it is noted that, in the case of access by another access network (for example WiFi), the authentication of the first service is not automatic. Indeed, in this case, the user must enter a login and/or a password so as to enable a service operator to retrieve the MSISDN number of the mobile terminal. An HTTP request accompanied by the MSISDN number certified by the access network can then be transmitted to the page server 41.

As shall be seen here below, the page server 41 communicates regularly with the applications server 42. In particular, during the first communication, the page server 41 hands over the task (i.e. transmits the HTTP query from the mobile terminal) to the applications server 42 and at the same time transmits the MSISDN number certified by the access network to this applications server 42.

In this particular embodiment, the applications server 42 has the functions of locating the IP address at which it can link up to the multimedia device 5 and authenticate itself directly or indirectly with this multimedia device.

To do this, the applications server 42 maintains the table 45 placing the following in correspondence: the MSISDN number of the mobile terminal, a multimedia equipment identifier, the IP address at which it can link up to the multimedia device and an access key to the multimedia device.

A description is now given of an example of successful sequencing of steps pertaining to a phase of initialization of a communication call between the applications server 42 and the multimedia device 5.

In a first stage, the applications server 42 makes a check in its (previously recorded) correspondence table to see whether the MSISDN number of the mobile terminal (certified by the access network) truly corresponds to a multimedia device 5 known to it. In the event of positive verification, the applications server 42 notes the IP address needed to access the multimedia device 5 and the corresponding access key.

In a second stage, the applications server 42 links up with the multimedia device 5 located at the previously noted IP address and implements an authentication mechanism based on the access key.

It will be noted that, in a direct connection mode, the multimedia device 5 itself possesses the IP address and uses the access key to authorize or not authorize access by the remote server 4.

By contrast, in an indirect connection mode, a home relay gateway 61 (for example of the LiveBox type) possesses the IP address and implements a NAT routing system enabling the multimedia device 5 requested by the user to be addressed. The access key permitting access by the remote server 4 to the multimedia device 5 can be implemented either by the multimedia device itself or, in an interposed mode, by the home relay gateway 61. It must be noted that the multimedia device 5 can be connected to the home relay gateway 61 through a wire link or radio link 62 (of the WiFi, Bluetooth or other similar type).

This combination of "intelligence in the network for the use of the multimedia device" and of the dual authentication mechanism (authentication of MSISDN and authentication of the access key) are important aspects of the implementation of an embodiment of the invention.

As already indicated, the remote server 4 is the master of the data exchanges with the multimedia device 5.

As an illustrative and non-restrictive example of an embodiment of the invention, a description is provided here below of the queries that can be transmitted by the remote server 4 ("the master") to the multimedia device 5 ("the slave"), through the communications network 3 and according to a master/slave communications protocol. It must be noted that, depending on the nature of the query, the remote server 4 and the multimedia device 5 exchange or do not exchange multimedia data. In any case, the multimedia device 5 executes the query and acknowledges it to the remote server.

The "LIST" query commands the multimedia device 5 to list the multimedia contents stored in its storage space 51. Naturally, this type of query can be executed only by a multimedia device equipped with a storage module. For this "LIST" query, the parameters transmitted by the remote server 4 are, for example: the directory to be listed, simple criteria such as files starting with A to D, etc. After reception and execution of the query, the multimedia device transmits the requested list of contents to the remote server.

The "GET" query commands the multimedia device 5 to send a multimedia content stored in its storage space 51. For this "GET" query, the parameters transmitted by the remote server 4 are, for example: the name and path of the requested multimedia file. Following the reception and execution of the query, the multimedia device transmits the multimedia data from the requested file to the remote server. Naturally, a stream control, of a type that is classic per se, is implemented by the remote server.

The "PUT" query commands the multimedia equipment 5 to store a multimedia content in its storage space 51. For this "PUT" query, the parameters transmitted by the remote server 4 are, for example: the name and path (on the storage space of the multimedia device) where the transmitted file will be stored. This type of request therefore enables the remote server to transmit and store multimedia data in the storage space of the multimedia device. Just as in the case of the "GET" query, the remote server implements a stream control of a type that is classic per se.

The "PLAY query commands the multimedia device 5 to play back multimedia data, through its content playback module, through a dedicated multimedia playback device, for example a television set, a home cinema etc. Should it be necessary to play a multimedia content stored in the multimedia device, the parameters transmitted by the remote server 4 are, for example, the name and path of the multimedia file (on the storage space of the multimedia device). However, if a multimedia content stored in a network storage unit has to be played, the parameters transmitted by the remote server 4 may be characteristics on the multimedia file such as, for example: its name, the title, the name of the artist, the duration, or any other parameter that can be used by the multimedia device 5 for display. In the embodiment illustrated, the network storage is embedded in the remote server.

As indicated here above, certain queries do not lead to an exchange of multimedia data between the remote server and the multimedia device. Thus, the "STOP (queries the multimedia device to stop the playback of multimedia content), "PAUSE" (queries the multimedia device to temporarily interrupt the playback of the multimedia content), "Volume+" (queries the multimedia device to diminish the sound volume of the playback) type queries enable only the control of control functions proper of the multimedia device.

Referring now to FIG. 1, a description is provided of the successive sequencing of the different steps of the method according to an embodiment of the invention.

A phase for requesting an access page to the multimedia device 5 comprises a first step E1 in which the user (through the MMI. of his mobile terminal) clicks on an Internet link available from a page (displayed on the screen of his mobile terminal) of its home-page portal. In the step E2, the page server 41 receives a http query 81 (corresponding to the user's request) accompanied by the MSISDN number 82 of the mobile terminal, certified by the access network 2 by means of the authentication mechanism SSO. In the step E3, the page server 41 transmits a home page 83 to the browser of the mobile terminal 1.

A phase of requesting the launch of a function on the multimedia device 5 comprises a step E4 in which the user clicks on a link (corresponding for example to the command of the listing of musical files) available on the home page 83 received by the browser 11.

The following steps pertain to a phase of translation of the request by the mobile terminal 1.

In the step E5, the page server 41 hands over the task (i.e. transmits the request of the mobile terminal) to the applications server 42 and transmits to this applications server 42 the MSISDN number 82 of the mobile terminal certified by the access network 2.

In the step E6, the applications server 42 implements the IP addressing and authentication mechanisms (authentication by access key) so as to link up directly or indirectly (for example through a residential gateway 61) to the multimedia device 5.

In the step E7, the applications server 42 translates the user's request in the form of a query comprehensible to the multimedia device 5 (example of the "LIST", "GET" or other types).

In the step E8, the applications server 42 transmits the query to the multimedia device 5 through the Internet 3 according to a "master/slave" communications protocol.

The step E9 pertains to a phase of reception and execution of the request by the multimedia device. Depending on the nature of the query, multimedia data can be exchanged between the applications server and the multimedia device, and vice versa.

The execution of the query by the multimedia device 5 is either in progress or completed. In both cases, a set of formatted information (built on the basis of the acknowledgement of the query by the multimedia device and possibly multimedia data transmitted E10 by the multimedia device to the applications server 42) is passed on E11 to the page server 41.

Finally, the page server 41 formats E12 the set of information in the form of a page or pages accepted by the browser 11 of the mobile terminal 1 (i.e. capable of being displayed on the screen of the mobile terminal) and transmits E13 the first page to this mobile terminal.

It must be noted that the present embodiment implements secured access to the multimedia device with the means of authentication of the access network.

Furthermore, the steps of the method according to an embodiment of the invention described here above can be applied both in remote use and in a proximate use of the multimedia device. Thus, the user interface and more generally the service offered to the user on his mobile telephone identical in both these configurations of use.

2. Control of a Multimedia Device in "Remote" Mode

Figure 2:
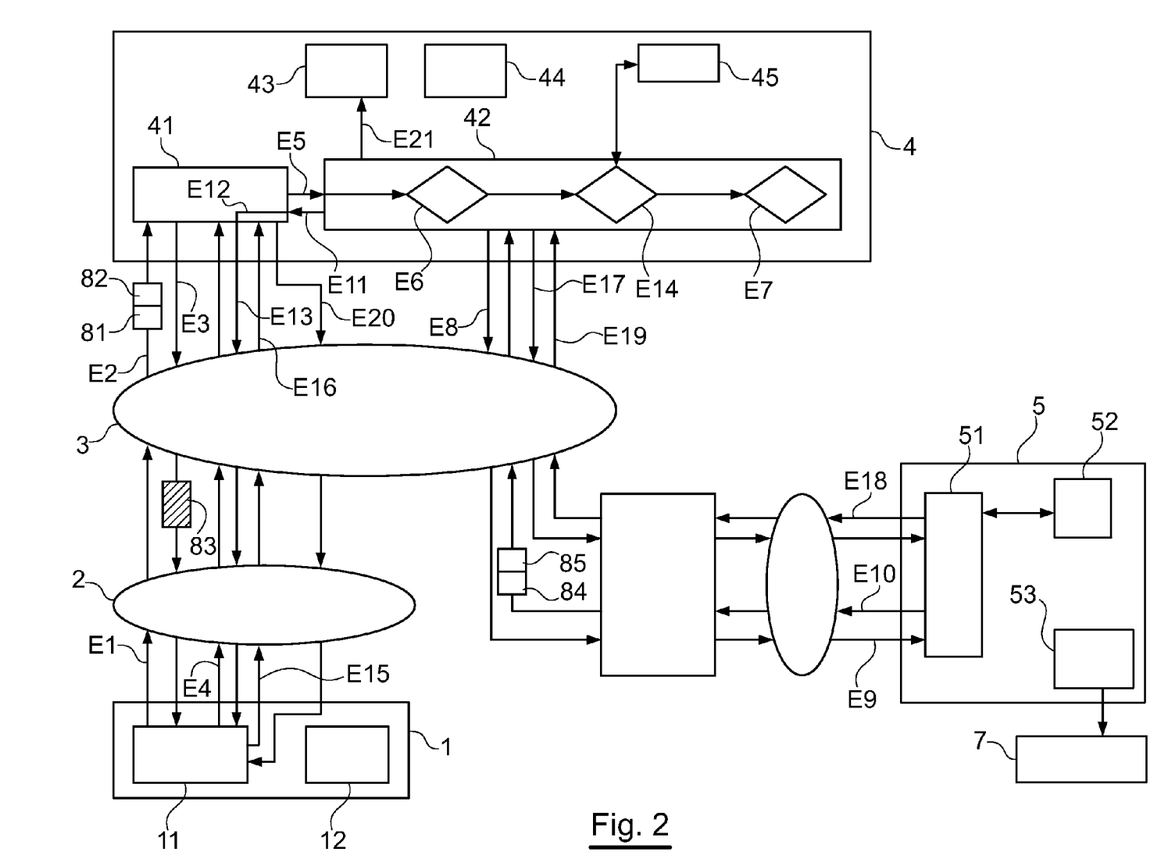
FIG. 2 illustrates a first particular embodiment of the invention in the case of a remote control of a multimedia device.

Referring now to FIG. 2, a description is provided of a first embodiment in which a user obtains remote access to a multimedia device from a mobile terminal. More specifically, here below in the document, four examples of this first embodiment are described.

As can be noted, certain steps of FIG. 2 are identical (having the same alphanumeric references) to certain steps described here above with reference to FIG. 1. These common steps (E1 to E13) are described again here below.

2.1 Downloading of a File to a Mobile Terminal

In a first example of the first embodiment (FIG. 2), a user uses the browser 11 of his mobile telephone 1 in order firstly to list the files of a particular type located in a remote multimedia device 5 and secondly to select the file from among the listed files so as to copy it to his mobile terminal.

In the present embodiment, the file requested by the user is a musical file in the MP3 format. Those skilled in the art will have no difficulty in extending this teaching to any other type of multimedia file (such as AVI, JPEG, etc).

A phase of requesting an access page to the multimedia device 5 comprises a first step E1 in which the user (using the MMI of his mobile terminal) clicks on an Internet link available from his home-page portal. In the step E2, the page server 41 receives a http query (corresponding to the user's request) accompanied by the MSISDN number 82 of the mobile terminal, certified by the access network 2 (cell network, GPRS, UMTS, etc) by means of the SSO authentication mechanism. In the step E3, the page server 41 transmits a home page 83 to the browser 11 of the mobile terminal.

A phase of requesting the launch of a function on the multimedia device comprises a step E4 in which the user clicks on a link corresponding to the listing of musical files available on the home page 83 received by the browser 11.

The following steps pertain to a phase of translation of the request by the mobile terminal 1.

In the step E5, the page server 41 hands over the task (i.e. transmits the request of the mobile terminal) to the applications server 42 and transmits to this applications server 42 the MSISDN number 82 of the mobile terminal certified by the access network 2.

In the step E6, the applications server 42 implements the IP addressing and authentication mechanisms (authentication by access key) so as to link up directly or indirectly (for example through a residential gateway 61) to the multimedia device 5.

In the step E14, the applications server 42 determines the physical directory in which the musical files in the multimedia device 5 are located. To do this, the applications server implements a correspondence table 45 giving it an indication, depending on the model of the multimedia device (this information may be pre-recorded in the correspondence table 45 described earlier), of the physical directory dedicated to the storage of the music.

In the step E7, the applications server 42 translates the user's request in the form of the "LIST query executable by the multimedia device 5.

In the step E8, the applications server 42 transmits the "LIST" query to the multimedia device through the Internet network 3 and according to a "master/slave" communications protocol.

In the step E9, the multimedia device 5 executes the "LIST query and transmits E10, to the applications server 42, the list 84 of musical files accompanied by their characteristics 85, such as for example their physical or logic access path in the storage module of the multimedia device.

In the step E11, the applications server 42 sends back these pieces of data 84 and 85 to the page server. In another embodiment, the applications server 42 enhances the data sent back to the page server 41 with additional data. It must be noted that the additional data may depend on the multimedia data stored in the multimedia device. For example, the added data may be keywords extract from the lists of multimedia data retrieved by the multimedia device. The multimedia device then uses these keywords to request appropriate servers (advertisement, concert data, online sale of music etc) for the offers related to these keywords.

In the step E12, the page server 41 formats the data of the list in the form of one or more pages (WML, XHTML or HTML, etc).

In the step E13, the first page (WML, XHTML or HTML, . . . ) containing the data of the list of musical files is transmitted to the mobile terminal 1 and then displayed on the browser 11 of this mobile terminal 1.

In the step E15, the user chooses to download a given musical file to his mobile terminal 1 by clicking on the corresponding link. This has the effect of sending the corresponding HTTP request to the page server 41.

In the step E16, the page server 41 receives the http request, and then hands over the task (i.e. transmits the request of the mobile telephone) to the applications server 42 which translates the request into a form comprehensible to the multimedia device. At this stage, the applications server 42 determines the path of the given musical file located in the storage module 52 of the multimedia device, on the basis of information received at the step E10 and builds a "GET" type query.

At the step E17, the applications server 42 transmits the "GET query to the multimedia device 5.

At the step E18, the multimedia device 5 transmits the bytes constituting the given musical file to the applications server 42 according to the exchange protocol between the applications server ("master") and the multimedia device ("slave").

Then, during the step E19, as and when the bytes arrive, the applications server 42 transmits these bytes to the page server 41 which formats them in the form of a protocol accepted by the browser 11 of the mobile telephone for the downloading of files (HTTP or other files). It must be noted that certain protocols for downloading to the mobile telephone (for example of the FTP type) may be directly processed by the applications server without being relayed through the page server. In one alternative embodiment, it is possible to wait for the full transfer of a musical file (i.e. of all the bytes that constitute it) on the applications server before retransmitting it to the mobile terminal.

Finally, during the step E20, the page server transmits, step-by-step, the pieces of data constituting the musical MP3 file requested by the user of the mobile telephone which stores them in a dedicated memory space (not shown).

In one alternative mode of implementation, it is possible to envisage a situation where a user requests a total or partial copying of the content of a multimedia device to a network storage unit 43. This network storage unit 43 may then be used as a mirror disk of multimedia contents. Thus, the user has the possibility, through the network storage unit, of accessing all or part of the content of the multimedia device despite the disconnection from the network or the powering off of the multimedia device.

As shall be seen here below the description, the user can be offered sophisticated services ("lay lists", "album photos", "streaming", etc) without in any way complicating the multimedia device, i.e. without embedding servers in this multimedia device.

2.2 Storage of a "Play List" in a Network Storage Unit

In a second example of the first embodiment (FIG. 2) the user uses the browser 11 of his mobile telephone to firstly list musical files located in a remote multimedia device 5 and secondly select several files, from among the musical files listed, in order to build and store a "play list" in the network storage unit 43.

For the sake of simplifying the description, a detailed description is provided here below of only the steps that differentiate the second example from the first example described here above. As will be noted, certain steps (E15 and E16) of the first example have been modified so as to enable the implementation of a service with a storage of "play lists".

As illustrated in FIG. 2, during the step E15, the user selects several musical files from the list of musical files displayed on the browser of the mobile telephone and clicks on a link pertaining to a request for setting up a play list.

In the step E16, the page server receives the http request corresponding to the request for setting up the play list, and then hands over the task (i.e. transmits the request) to the applications server.

In the step E21, the applications server 42 brings about a recording of the characteristics of the "play list" (i.e. the characteristics of the selected files) in a network storage 43 reserved for the user.

Then, in the next step (not shown), the applications server acknowledges the action of the page server which then builds an acknowledgement page (WML, XHTML, etc) for the request.

Finally, during the last step (not shown), the acknowledgement page (WML, XHTML, . . . ) of the request is transmitted and displayed on the browser of the mobile terminal.

2.3 Consultation of Photo Files

In a third example of the first embodiment (FIG. 2), the user uses the browser of his mobile telephone firstly to list photos located in a remote multimedia device and, secondly, to select a photo from among the listed photos so as to display it on the mobile terminal.

For the sake of simplifying the description, details are given here below of only the steps that differentiate the third example from the first example described here above. As will be noted, certain pages (E1, E15, E18 to E20) of the first example have been modified so as to enable the implementation of a photo file consultation service.

Referring to FIG. 2, at a step E1, the user clicks on a link to obtain a display of the photos located in the multimedia device.

At the step E15, the user selects a photo from among a plurality of photos and clicks on a link pertaining to a "display" type request.

At the step E18, the multimedia device transmits the bytes constituting the photo file to the applications server.

Then, at the step E19, the applications server 42 modifies the photo in order to adapt it to the characteristics of display of the mobile telephone (resolution, size etc).

Then, during the step E20, the data elements of the photo file are transmitted by the page server to the mobile terminal which displays the photo on its screen.

In another alternative embodiment, the user can set up a photo album that can be stored in the network storage unit. Thus, it is possible to envisage the implementation of value-added services on the basis of these albums, for example a high-quality paper printing service.

2.4 Listening to a File in Streaming Mode

In a fourth example of the first embodiment (FIG. 2), a user uses the browser of his mobile telephone firstly to list musical files located in a remote multimedia device and, secondly, to select the file from among the listed musical fires so as to make it stream for listening on his mobile terminal.

For the sake of simplifying the description, a detailed description is provided here below of only the steps that differentiate the fourth example from the first example described here above. As will be noted, certain steps (E15) of the first example have been modified so as to enable the implementation of a service for listening to files in "streaming mode".

As illustrated in FIG. 2, during the step E15, the user selects one file out of a plurality of musical files and clicks on a link pertaining to a "streamer" type request.

Then, in another step (not shown), as and when the bytes arrive, the applications server 42 transmits these bytes to the streaming server 44 which formats them in the form of the protocol accepted by the streaming customer 12 of the mobile terminal (for example of an RTSP type) and according to the capacities of the access network 2 of the mobile terminal.

Finally, in the last step (not shown), the streaming customer 12 of the mobile terminal receives, step-by-step, the data constituting the musical file requested by the user who listens to the corresponding music, simultaneously with the arrival of the data, through the sound playback means (not shown) of his mobile terminal.

In the embodiment illustrated, the streaming server 44 is embedded in the remote server 4. Advantageously, this streaming server 44 can adapt to the constraints of the different types of mobile terminals (i.e. to the streaming and encoding protocols of the different terminals) and access networks.

3. Control of a Multimedia Device in "Local Mode"

Figure 3:
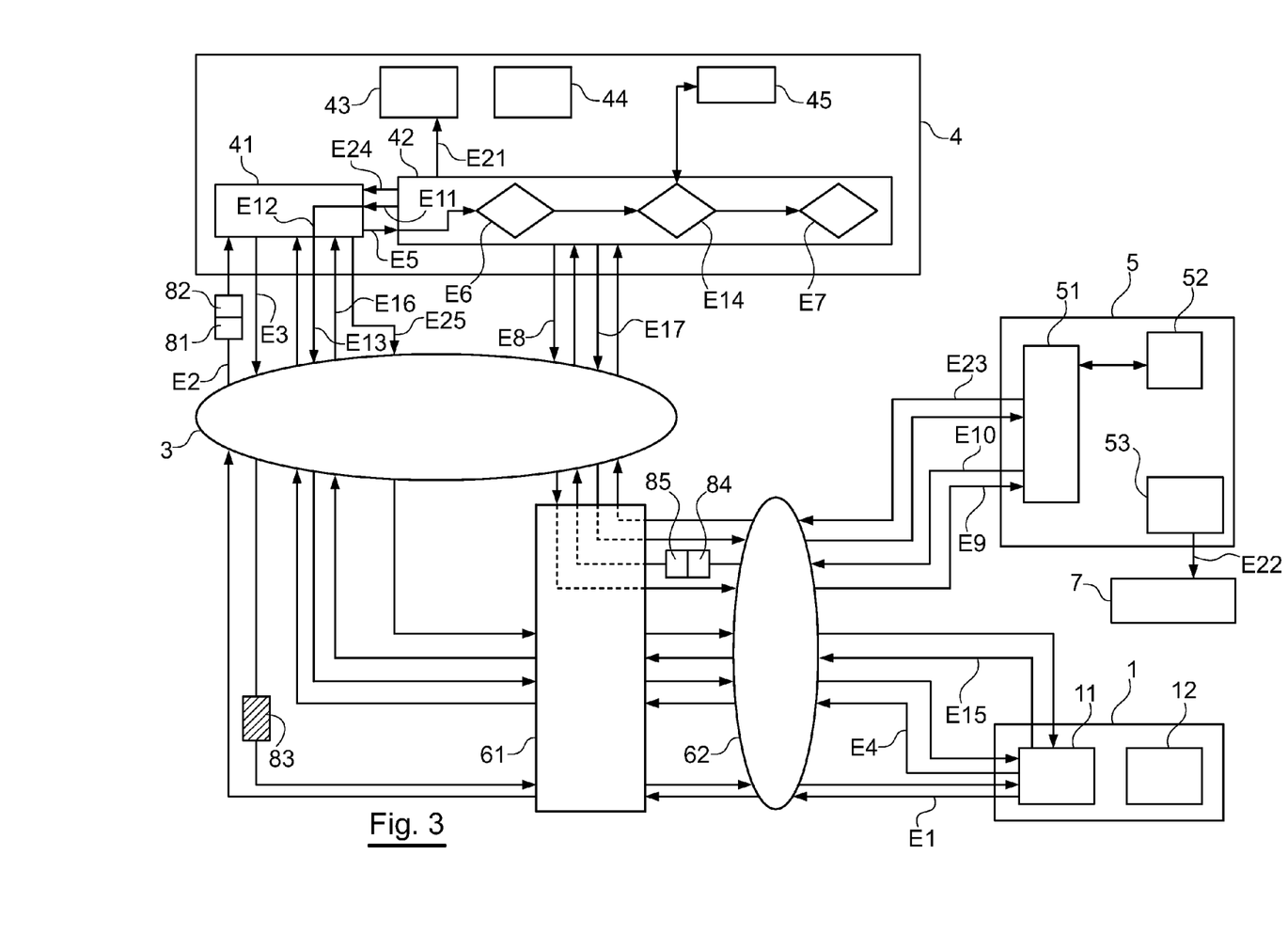
FIG. 3 illustrates a second particular embodiment of the invention in the case of a local control of a multimedia device.

Referring now to FIG. 3, we present a second embodiment in which a user achieves local access (proximate use of the multimedia device) to a multimedia device from a mobile terminal. More specifically, here below in this document, two examples of this second embodiment are described.

As will be noted, certain steps of FIG. 3 are identical (using the same alphanumeric references) to certain steps described here above with reference to FIGS. 1 and 2. For the sake of clarity, these common steps are not described again here below.

3.1 Reading of a Musical File on a Multimedia Device.

In a first example of the second embodiment (FIG. 3), a user uses the browser 11 of his mobile terminal in order firstly to list musical files (for example in the MP3 format) located in a near or proximate multimedia device 5 (Hi-Fi system, home cinema etc.) and secondly to select the file from among the listed musical files so as to have it played back by the multimedia device 5.

In the present embodiment, the mobile terminal 1 communicates with the remote server 4; either through a cell network or through a wireless proximity link 62 WiFi, Bluetooth, . . . ) connected to a high-bit-rate link (for example of the ADSL type).

It must be noted that, in the case of local use, the mobile telephone may propose a user interface (use menus) to the user that is identical to the one proposed in the case of remote use. Furthermore, in the case of local use, the remote server can enhance the user interface with the functions of playback/control of the multimedia device such as for example the "PLAY", "STOP", "Pause", "Volume+", "Volume−", and other functions.

Furthermore, in the case of local use, the page server receives an http request from the mobile terminal (corresponding to the user's request) accompanied by the MSISDN number of the mobile terminal certified by an identification or authentication mechanism.

This mechanism may be especially:

a login and/or a password entered by the user at the very start of the user's access to the portal of his service operator, enabling the service operator to retrieve the MSISDN number of the mobile terminal and then pass it as certified to the page server 41 (using an SSO mechanism), or else another mechanism implementing the authentication mechanisms based on the SIM card of the mobile but through a WiFi or Bluetooth access network.

For the sake of simplification, a detailed description is provided here below of only those steps that differentiate the first example of the second embodiment from the first example of the first embodiment described here above. As can be noted, certain steps (E15 to E17) of the first example of the first embodiment have been modified so as to enable implementation of a service for reading musical files in "local mode".

As illustrated in FIG. 3, at the step E15, the user chooses to make the multimedia device play a given musical files by clicking on the corresponding link. This has the effect of sending the corresponding HTTP request to the page server.

At the step E16, the page server receives the http request and then passes hands over the task (i.e. transmits the request from the mobile terminal) to the applications server which translates the request into a form that is comprehensible to the multimedia device. At this stage, the applications server determines the path of the given musical files located in the storage module of the multimedia device, on the basis of information received at the step E10 and builds a "PLAY" type query.

At the step E17, the applications server transmits the "PLAY" query to the multimedia device.

At the step E22, the multimedia device activates the reading of the file on the Hi-Fi.

At the step E23, the multimedia device acknowledges the launch of the action to the applications server.

Then, at the step E24, the applications server acknowledges the action of the page server which then builds a browser page (WML, XHTML, . . . ) presenting menus for the remote control of the multimedia device (<<PLAY>>, <<STOP>>, <<Pause>>, <<Volume+>>, <<Volume−>>, . . . ).

Finally, at the step E25, the browser page (WML, XHTML, . . . ) is transmitted and displayed on the browser of the mobile terminal.

3.2 Playback of a "Play List" on a Network Storage Unit

In a second example of the second embodiment (FIG. 3), a user uses the browser 11 of his mobile telephone to obtain the playing of a play list stored in his network storage unit 43.

In this particular embodiment, only the list or lists of the musical files (i.e. the play list) are stored in the network storage unit. All the files themselves remain stored in the multimedia device.

The user requests the remote server for an access page to the multimedia device by clicking (through the MMI of his mobile terminal) on an Internet link available from a page (displayed on the screen of his mobile terminal) of his homepage portal.

The page server receives an http query (pertaining to the user's request) accompanied by the MSISDN number of the mobile terminal, certified by an identification and authentication mechanism. This mechanism may be especially:

- a login and/or a password entered by the user at the very start of the user's access to the portal of his service operator, enabling the service operator to retrieve the MSISDN number of the mobile terminal and then pass it as certified to the page server 41 (using an SSO mechanism),
- or else another mechanism implementing the authentication mechanisms based on the SIM card of the mobile but through a WiFi or Bluetooth access network.

The page server then transmits a home page to the browser of the mobile terminal.

The user clicks on a link of the home page corresponding to the listing of the play lists preliminarily constituted by the user and recorded in the network storage.

The page server hands over the task (i.e. transmits the request of the mobile terminal) to the application server and transmits the MSISDN number of the mobile terminal, certified by the proximity radio access network, to this server.

The applications server implements the IP addressing and authentication mechanisms (authentication by access key) so as to link up directly or indirectly (for example through a residential gateway) to the multimedia device.

If the multimedia device is available, the applications server requests the network storage for the list of the user's play lists.

The network storage then sends the applications server the user's play list accompanied by their characteristics such as, for example, the physical or logic access path on the storage module of the multimedia device.

The page server formats the list of "play lists" (and their characteristics) in the form of a page (WML, XHTML or HTML, etc) and transmits this page to the mobile terminal. The mobile terminal then displays the list of the "play lists" on its browser.

Among the "play lists" displayed, the user selects one "play list" and clicks on a link corresponding to the reading of the selected "play list".

The page server receives the http request and then hands over the task (i.e. transmits the request from the mobile terminal) to the applications server which translates the request in the form of a query (of the PLAY type) consisting in effecting play of the first file of the play list.

At this stage, the applications server determines the path of the first musical file in the storage module of the multimedia device on the basis of the characteristics of the play list and builds a "PLAY" type query.

The application server transmits the "Play" request to the multimedia device with the name and path of the first musical files as parameters.

The multimedia device activates the reading of the first musical file, for example on the Hi-Fi, and acknowledges the launch of this action to the server.

Then, the applications server acknowledges the action to the data server which then builds a browser page (WML, XHTML, . . . ) having menus for the remote control of the multimedia device (<<PLAY>>, <<STOP>>, <<Pause>>, <<Volume+>>, <<Volume−>>, . . . ).

The browser page (WML, XHTML, . . . ) is transmitted and displayed on the browser of the mobile terminal.

At the end of the reading of the first musical file, the multimedia device sends the applications server an end-of-reading acknowledgement. The applications server then sends the multimedia device a "Play" query asking it to play the second musical files of the "play list".

Figure 4:
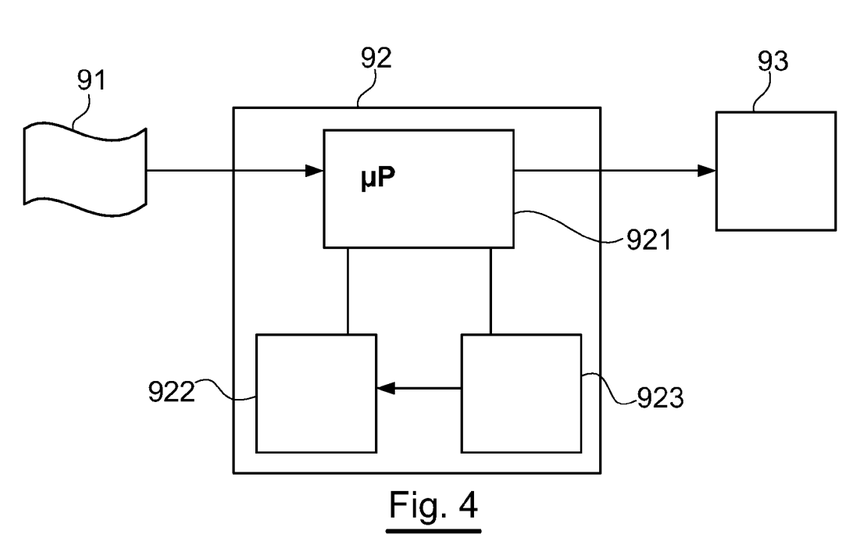
FIG. 4 presents the structure of a particular embodiment of a multimedia device according to an embodiment of the invention.

FIG. 4 shows the structure of a multimedia device 92 according to an embodiment of the invention comprising a memory 922 and a processing unit 921 equipped with a microprocessor µP driven by a computer program (or application) 923 implementing the method according to an embodiment of the invention. The processing unit 921 receives a query 91 at input pertaining to a request for the launch of a function on the multimedia device. The microprocessor µP processes this query according to the instructions of the program 923 so that, depending on the nature of the query, the multimedia device transmits multimedia data to a remote server 93 or generates a multimedia file control command.

Figure 5:
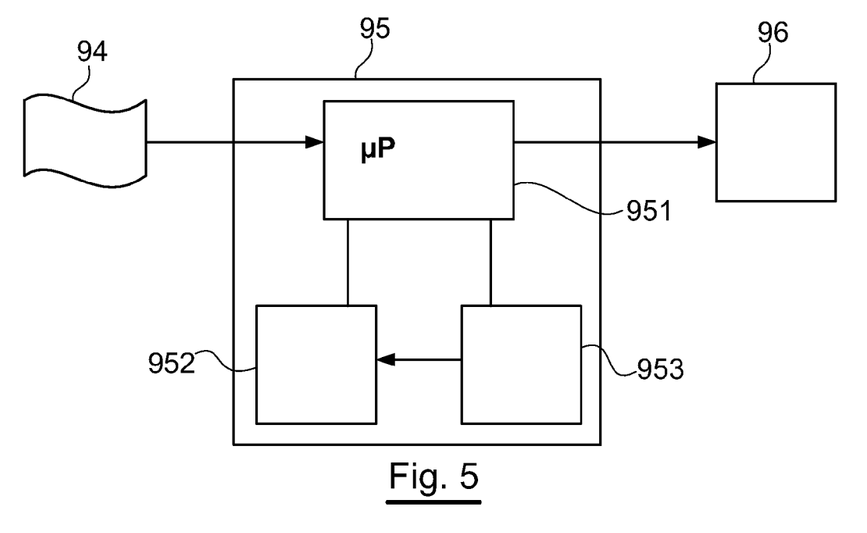
FIG. 5 presents the structure of a particular embodiment of a management server according to an embodiment of the invention.

FIG. 5 finally presents a structure of a remote server 95 according to an embodiment of the invention comprising a memory 952 and a processing unit 951 equipped with a microprocessor µP driven by a computer program (or application) 953 implementing the method according to an embodiment of the invention. The processing unit 951 receives a request 94 at input for the launch of a function on the multimedia device 92 described in FIG. 4. The microprocessor µP processes this request according to the instructions of the program 953 to generate a request 96 executable by the multimedia device 92.

The technique of an embodiment of the invention has many advantages, a non-exhaustive list of which is given here below.

It improves the ergonomy of the user interface. Indeed, an embodiment of the invention is based on the transfer of the logic and user interface to a remote server. This remote server co-operates with several servers (data server, streaming server etc) so as to offer sophisticated services (reading in streaming mode, play lists etc) to the user without having to make any complex and costly modification in a multimedia device. An embodiment of the invention also enables the user to have identical services available in local use and remote use of the multimedia device. An embodiment of the invention furthermore enables a services operator to achieve the simple and efficient attachment of value-added services (advertisements, proposals for purchases, browsing commands for the multimedia device etc) to the daily use of the multimedia device. An embodiment of the invention thus enables the user to obtain access in streaming mode to multimedia content, whatever the type of mobile terminal and access network used, and to do so without having to host a costly transcoding and streaming server in the multimedia device.

It improves the securing of the access to a multimedia device. Indeed, an embodiment of the invention is based on the authentication of a mobile terminal by a remote server and the authentication of the remote server by the multimedia device. This dual authentication mechanism must be verified to enable access of the mobile terminal to the multimedia device.

An embodiment of the invention can be applied especially to any type of multimedia device and especially but not exclusively to multimedia devices connected to a communications network through a residential gateway (for example of the LiveBox, FreeBox and other types).

An embodiment of the invention provides a technique for controlling a multimedia device from any mobile terminal, this technique being simple to implement, without requiring the embedding in the multimedia device of a management server that is complex and costly, especially in terms of memory.

A technique of this kind, in a particular embodiment, is especially well suited to service operators wishing to regularly modify the user interface of the multimedia device in order to attach value-added services thereto (for example advertisements, proposals for purchases, etc).

A technique of this kind, in a particular embodiment, enables access to be provided in streaming mode to multimedia contents, whatever the type of mobile terminal and the access network used, without necessitating the hosting, in the multimedia device, of a costly transcoding and streaming server.

In an embodiment, a technique of this kind enables better securing of access to a multimedia equipment.

A technique of this kind, in one particular embodiment, enables a mobile terminal to display a service identically, whatever the type of use, whether near or remote, of the multimedia equipment.

A technique of this kind, in one embodiment, costs little and is compatible with all the multimedia devices for the playback and/or storage of multimedia contents for large-scale consumer use.

A technique of this kind, in one embodiment, enables the user to access all or part of the content of a multimedia device when this device is disconnected from the communications network or powered off.

Although the present disclosure has been described with reference to one or more examples, workers skilled in the art will recognize that changes may be made in form and detail without departing from the scope of the disclosure and/or the appended claims.

The invention claimed is:

1. A method for controlling a multimedia player by a mobile terminal, the multimedia player being able to store within the player multimedia contents and/or to playback multimedia contents stored within the multimedia player, the mobile terminal and the multimedia player being connected to a communications network, wherein the method comprises the following steps:
the mobile terminal sends to a remote server, through the communications network, at least one request for controlling the multimedia player to execute at least one command belonging to the group comprising: a PLAY command for playing back at least one multimedia content stored within the multimedia player and a STOP command for stopping playback of the multimedia content;
the remote server translates said at least one request of the mobile terminal into at least one query and transmits said at least one query to the multimedia player through the communications network;
the multimedia player receives and executes said at least one query;

a first authentication enabling the remote server to authenticate the mobile terminal and comprising the following steps:
an access network, through which the mobile terminal is connected to the communications network, certifies an identifier of the mobile terminal; and
the remote server receives the identifier of the mobile terminal certified by the access network; and
a second authentication enabling the multimedia player to authenticate the remote server, and comprising the following steps:
the remote server maintains a table which associates, with the identifier of the mobile terminal, an identifier of the multimedia player, an address at which the multimedia player can be contacted within the communications network and an access key to the multimedia player; and
from the identifier of the mobile terminal certified by the access network, the remote server retrieves the address and the access key in the table, links up with the multimedia player by using the address, and implements a process of authentication based on the access key.

2. The method according to claim 1 wherein, in the case wherein the execution of said at least one query comprises transmission of multimedia data from the multimedia player to the remote server, the method further comprises the following steps:
the remote server translates the multimedia data transmitted by the multimedia player into converted multimedia data presenting a form that can be understood by the mobile terminal;
the remote server transmits the converted multimedia data to the mobile terminal.

3. The method according to claim 2, wherein the method further comprises the following step:
the remote server enhances the converted multimedia data with additional data so as to transmit enhanced data to the mobile terminal.

4. The method according to claim 1, further comprising: sending a further request for controlling the multimedia player from the mobile terminal to the remote server, which the remote server translates into at least one further query, which belongs to the group comprising:
a query to supply a list of multimedia contents stored within the multimedia player;
a query to supply a multimedia content stored within the multimedia player;
a query to store a multimedia content within the multimedia player;
a query to playback by the multimedia player a multimedia content stored within the multimedia player;
a query to stop the playback by the multimedia player of a multimedia content stored within the multimedia player;
a query to temporarily interrupt the playback by the multimedia player of a multimedia content stored within the multimedia player;
a query to increase a sound volume of the playback by the multimedia player of a multimedia content stored within the multimedia player; or
a query to reduce the sound volume of the playback by the multimedia player of a multimedia content stored within the multimedia player; and
transmitting the further query to the multimedia player by the remote server.

5. The method according to claim 4, wherein, in the case wherein the multimedia player executes a query for the supply of a multimedia content, the method further comprises the following steps:
- the remote server receives a multimedia content transmitted by the multimedia player;
- a streaming server included in the remote server retransmits the multimedia content continuously, in "streaming" mode, to the mobile terminal.

6. The method according to claim 4, wherein, in the case wherein the multimedia player executes a query for supplying a multimedia content stored within the multimedia player or a query for supplying a list of multimedia contents stored within the multimedia player, the method further comprises the following steps:
- the remote server receives a multimedia content or a list of multimedia contents transmitted by the multimedia player;
- the remote server commands the storage of the multimedia content or the list of multimedia contents in a network storage space coupled with the remote server so that the mobile terminal can subsequently request the remote server to command the reading of the multimedia content or the list of multimedia contents stored in the network storage space.

7. The method according to claim 1, wherein exchanges between the mobile terminal and the remote server are implemented by a page browser, included in the mobile terminal, and a page server, included in the remote server.

8. The method according to claim 1, wherein exchanges between the remote server and the multimedia player are implemented by an applications server included in the remote server, and a query-processing and data-transfer module included in the multimedia player.

9. A computer program product recorded in a non-transitory computer-readable memory comprising program code instructions for execution, by a remote server, of a method for controlling a multimedia player by a mobile terminal, the multimedia player being able to store within the multimedia player multimedia contents and to playback multimedia contents stored within the multimedia player, the mobile terminal and the multimedia player being connected to a communications network, wherein the method comprises:
- receiving by the remote sever at least one request sent by the mobile terminal to the remote server through the communications network, the at least one request for controlling the multimedia player to execute at least one command belonging to the group comprising: a PLAY command for playing back at least one multimedia content stored within the multimedia player and a STOP command for stopping playback of the multimedia content;
- the remote server translates said at least one request of the mobile terminal into at least one query and transmits said at least one query to the multimedia player through the communications network, such that the multimedia player receives and executes said at least one query;
- a first authentication enabling the remote server to authenticate the mobile terminal and comprising the following step:
  - the remote server receives an identifier of the mobile terminal from an access network, which is certified by the access network, wherein the mobile terminal is connected to the communications network through the access network; and
- a second authentication enabling the multimedia player to authenticate the remote server, and comprising the following steps:
  - the remote server maintains a table which associates, with the identifier of the mobile terminal, an identifier of the multimedia player, an address at which the multimedia player can be contacted within the communications network and an access key to the multimedia player; and
  - from the identifier of the mobile terminal certified by the access network, the remote server retrieves the address and the access key in the table, links up with the multimedia player by using the address, and implements a process of authentication based on the access key.

10. A computer program product recorded in a non-transitory computer-readable memory comprising program code instructions for execution, by a multimedia player, of a method for controlling the multimedia player by a mobile terminal, the multimedia player being able to store within the multimedia player multimedia contents and to playback multimedia contents stored within the multimedia player, the mobile terminal and the multimedia player being connected to a communications network, wherein the method comprises:
- receiving at least one query by the multimedia player from a remote server, the at least one query having been translated by the remote server from at least one request sent by the mobile terminal to the remote server, through the communications network, wherein the mobile terminal is connected to the communications network through an access network, the at least one query corresponding to a request for controlling the multimedia player execute at least one command belonging to the group comprising: a PLAY command for playing back at least one multimedia content stored within the multimedia player and a STOP command for stopping playback of the multimedia content;
- executing said at least one query received by said remote server by said multimedia player; and
- an authentication process initiated by the remote server, enabling the multimedia player to authenticate the remote server, the authentication process comprising steps of:
  - the multimedia player receiving from the remote server an access key through an address at which the multimedia player can be contacted within the communications network, the address and access key being associated to an identifier of the mobile terminal that is certified by the access network during a previous authentication process between the remote server and the mobile terminal; and
  - the multimedia player implementing the authentication process based on the access key received from the remote server.

11. A multimedia player of a type that can be connected to a communications network, wherein the multimedia player comprises:
- means for receiving and executing of at least one query transmitted according to a master/slave communications protocol by a remote server, called a "master" through the communications network, said query corresponding to the translation of a request made by a mobile terminal and received by the remote server, through the communications network, wherein the mobile terminal is connected to the communications network through an access network, said request being a request for controlling the multimedia player to execute at least one command belonging to the group comprising: a PLAY command for playing back at least one multimedia content stored within the multimedia player and a STOP command for stopping playback of the multimedia content; and means for authenticating the remote server, comprising:

receiving from the remote server an access key through an address at which the multimedia player can be contacted within the communications network, the address and access key being associated to an identifier of the mobile terminal that is certified by the access network during a previous authentication process between the remote server and the mobile terminal; and authenticating the remote server based on the access key received from the remote server.

12. A server of a type that can communicate with a mobile terminal and a multimedia player, through a communications network, wherein the server comprises:

means for receiving through the communications network of at least one request transmitted by the mobile terminal, said request being a request for controlling the multimedia player to execute at least one command belonging to the group comprising: a PLAY command for playing back at least one multimedia content stored within the multimedia player and a STOP command for stopping playback of the multimedia content;

first means for translating said at least one request of the mobile terminal into at least one query comprehensible by the multimedia player;

first means for transmitting said at least one query to the multimedia player through the communications network;

means for authenticating the mobile terminal, comprising receiving an identifier of the mobile terminal that has been certified by an access network through which the mobile terminal is connected to the communications network;

a table which associates, with the identifier of the mobile terminal, an identifier of the multimedia player, an address at which the multimedia player can be contacted within the communications network and an access key to the multimedia player; and means for retrieving from the identifier of the mobile terminal certified by the access network, the address and the access key in the table, linking-up with the multimedia player by using the address, and implementing a process of authenticating the remote server based on the access key.

13. The server according to claim 12, wherein the server comprises at least one of the following means:

means for storing multimedia data transmitted by the multimedia player, through the communications network;

second means for translating said multimedia data of the multimedia player into converted multimedia data, presenting a form comprehensible by the mobile terminal;

second means for transmitting the converted multimedia data to the mobile terminal, through the communications network;

third means for transmitting the converted multimedia data continuously, in "streaming" mode, to the mobile terminal, through the communications network.

* * * * *